United States Patent [19]

Ahlberg

[11] 4,081,663
[45] Mar. 28, 1978

[54] ELECTRONIC TAXIMETER HAVING MASTER-REMOTE SLAVE TARIFF AND FARE DISPLAYS

[75] Inventor: Erik Jan Krister Ahlberg, Halmstad, Sweden

[73] Assignee: Haldex Aktiebolag, Sweden

[21] Appl. No.: 760,983

[22] Filed: Jan. 21, 1977

[51] Int. Cl.² .............................................. G07B 13/10
[52] U.S. Cl. .................................. 364/467; 235/30 R
[58] Field of Search ............... 235/151.32, 151, 30 R, 235/92 T, 92 CP, 152

[56] References Cited

U.S. PATENT DOCUMENTS

| | | | |
|---|---|---|---|
| 3,946,213 | 3/1976 | Kepper | 235/151.32 |
| 3,983,378 | 9/1976 | Tammi | 235/151.32 |
| 4,001,560 | 1/1977 | Larsen | 235/151.32 |

*Primary Examiner*—Edward J. Wise
*Attorney, Agent, or Firm*—Robert E. Burns; Emmanuel J. Lobato; Bruce L. Adams

[57] ABSTRACT

An electronic taximeter of the type including fare computing circuitry for developing a sequence of pulses at a rate representative of a fare accrual rate computed according to a particular tariff, and a tariff selecting circuit operable for selecting tariff control signals representative of the tariff at which the fare is being computed. A master-remote slave display pair displays both the accrued fare as it continually accrues, and a tariff at which the accruing fare is being computed. Both of the displays include a plurality of counters which continually count the sequence of pulses for developing a cumulative pulse count continually representative of the accrued fare. Both of the displays also include display elements for displaying numerals representative of the fare, and respective decoders for receiving the cumulative pulse count within the respective counting circuits and decoding the same to drive respective display elements. Both of the displays each include a respective tariff display circuit for receiving tariff control signals to indicate the tariff at which the fare is being computed. The master display includes a multiplexer for multiplexing the tariff control signals, and the remote slave display includes a demultiplexer for demultiplexing the same and applying the demultiplexed tariff control signals to respective tariff display indicating elements. The multiplexed tariff control signals are applied over three wires and the sequence of pulses are applied to the remote slave display over a single conductive path.

12 Claims, 1 Drawing Figure

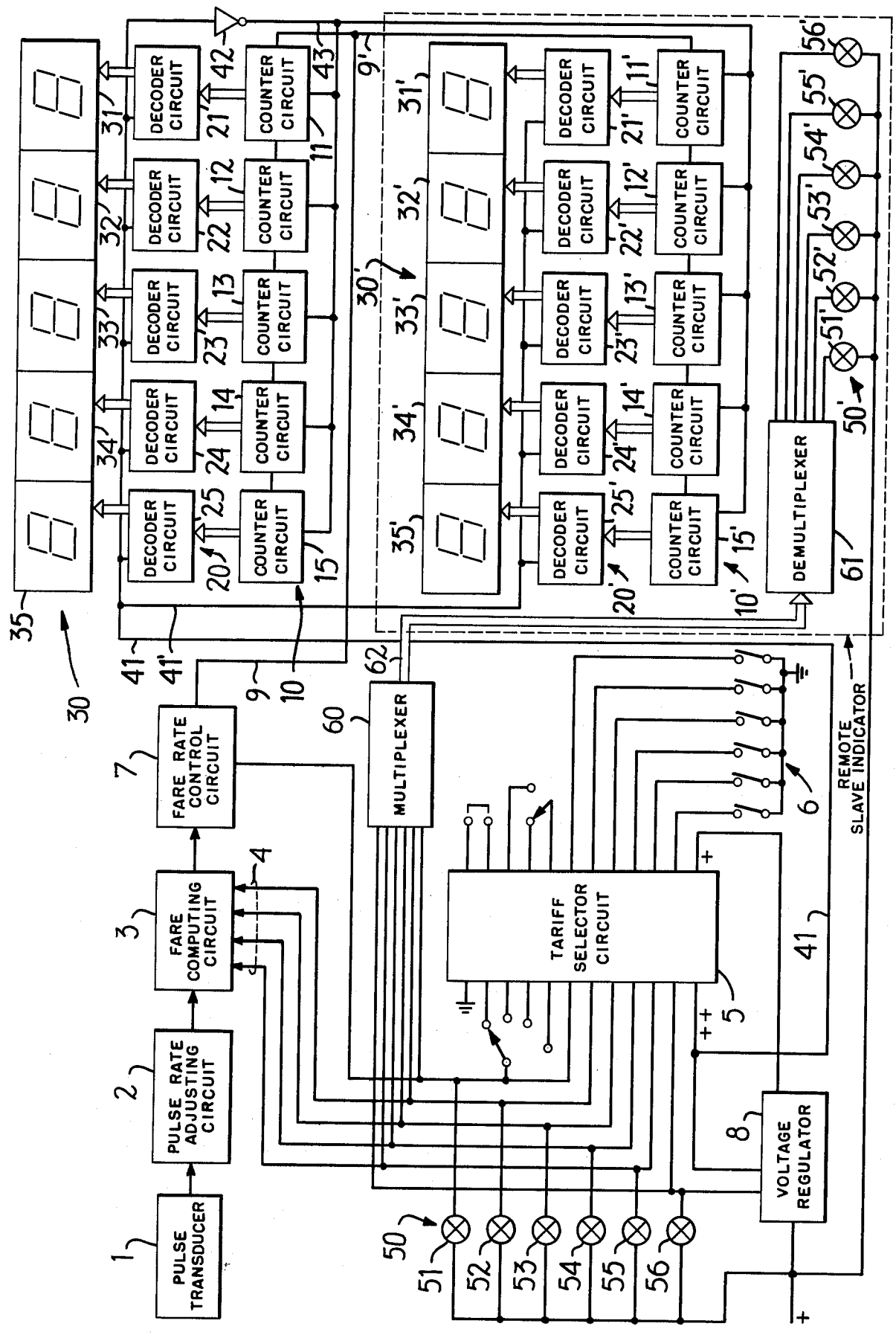

ELECTRONIC TAXIMETER HAVING MASTER-REMOTE SLAVE TARIFF AND FARE DISPLAYS

BACKGROUND OF THE INVENTION

The present invention relates to an electronic taximeter for computing a fare in accordance with a selectable tariff, and more particularly to such an electronic taximeter which includes a display for continually displaying the fare as it accrues, and for displaying a tariff at which the fare is being computed.

Electronic taximeters are known. The known electronic taximeters generally include a transducer coactive with a wheel or a transmission of a taxi for developing pulses at a rate determined by the speed of the taxi. These pulses are received by fare computing circuitry which calculates a fare in accordance with a selected tariff and the number of pulses received from the transducer during a trip.

The known electronic taximeters also include displays for displaying a fare. The fare display is generally located near a taxi driver to enable him to easily read it, and this necessitates a passenger in a back seat of the taxi having to shift around in order to get a good look at the fare display. It would be desirable to provide a duplicate display at the back seat of a taxi, or positioned somewhere closer to passengers in the back seat so that they can conveniently determine the fare themselves by inspection of the fare display.

The problems arising from trying to provide a duplicate fare display are substantial. These fare displays generally include a plurality of display elements which display numerals and which are each driven by a plurality of different signals which determine the particular numerals indicated by the display elements. A display element commonly employed is comprised of an array of seven segments which may be individually illuminated or which may be illuminated in different combinations in order to define different luminous numerals. Each of these display elements requires seven different input leads for receiving seven different input signals to drive different ones of the segments. Thus, if the fare display is comprised of five display elements, a total of at least thirty five different leads is required to drive the fare display. If a duplicate display is provided remote from the electronic taximeter normally positioned near the driver, then at least thirty five leads are required to connect the duplicate display with the electronic taximeter, exclusive of power leads, control signal leads, etc. Moreover, if the display and duplicate display also indicate tariff as well as accrued fare, even more connecting leads are required.

The connecting leads between a duplicate display and an electronic taximeter normally include a connector to permit disconnection of the duplicate display in order to allow it to be easily installed and removed for repair. This connector is a source of considerable problems. Taxicabs are high vibration environments and electrical connectors subjected to the vibrations become intermittent. Even high quality connectors are not completely immune from vibration caused intermittance, and the repair or replacement of these connectors is time consuming and costly. Moreover, it is irritating to passengers when the duplicate display malfunctions and displays incorrect fares, and this is a source of ill will towards the taxicab driver and company.

SUMMARY OF THE INVENTION

It is an object of the present invention to provide an electronic taximeter having a master display and a remote slave display, each for displaying a fare and a tariff at which the fare is computed.

Another object of the present invention is to provide a master-remote slave display pair in an electronic taximeter, which both simultaneously displays an accrued fare as it continually accrues, and the tariff at which the fare is being computed.

It is still another object of the present invention to provide a reliable master-remote slave display pair in an electronic taximeter in which the remote slave display is connected to the electronic taximeter with a minimum number of connecting leads.

The electronic taximeter according to the invention comprises fare computing means responsive to tariff control signals for developing a sequence of pulses at a rate representative of an accrual rate at which a fare being computed according to the tariff represented by the tariff control signals accrues, and a tariff selecting means operable for selecting the tariff control signals for changing the repetition rate of the sequence of pulses. A master-remote slave display pair displays the tariff at which the fare is being computed and displays the accrued fare as it continually accrues. The master display comprises counting means operable to continually count the sequence of pulses for developing a cumulative pulse count continually representative of the accrued fare represented by a number of pulses developed, and the counting means includes resetting means responsive to a reset signal for resetting the counting means to clear the cumulative pulse count stored therein. The master display further comprises fare display means for displaying the accrued fare represented by the cumulative pulse count stored in the counting means, and decoding means connected to receive the cumulative pulse count stored in the counting means for decoding the cumulative pulse count and connected to the display means to apply the decoded pulse count to the display means for driving the same in order to display the accrued fare. The decoding means is normally inoperative and includes enabling means responsive to an enabling signal for rendering the decoding means operative. Reset signal generating means normally develops a reset signal and applies the reset signal to the resetting means for resetting the counting means and is rendered inoperative by and connected to receive the enabling signal for terminating the reset signal thereby to render the counting means operative to count the sequence of pulses upon the occurrence of the enabling signal. Tariff display means is receptive of the tariff control signals for displaying the tariff at which the fare is being computed. The remote slave display is located remote from the master display and comprises a second counting means operable to continually count the sequence of pulses for developing a cumulative pulse count continually representative of the accrued fare, and the second counting means includes second resetting means responsive to the reset signal for resetting the second counting means. Second fare display means displays the accrued fare represented by the cumulative pulse count stored in the second counting means. Second decoding means is connected to receive the cumulative pulse count stored in the second counting means and is connected to the second display means to apply the decoded pulse count to the second display means for driving the same to display the accrued fare. The second decoding means is normally inoperative and includes enabling means responsive to the enabling signal for rendering the second decoding means operative. Second tariff display means is responsive to the tariff control signals for displaying the tariff. The electronic taximeter further comprises means for applying the sequence of pulses to the second counting means, means for applying the enabling signal to the second decoding means, means for applying the reset signal to the second resetting means, and means for applying the tariff control signals to the second tariff display means.

BRIEF DESCRIPTION OF THE DRAWING

Other features and advantages of the electronic taximeter with the master-remote slave display pair according to the invention will be apparent from the disclosure and appended claims and drawing which illustrates an electronic taximeter including the pair of displays according to the invention.

DESCRIPTION OF THE PREFERRED EMBODIMENT

The master-remote slave display pair according to the invention is illustrated in the drawing incorporated in an electronic taximeter. The taximeter includes a pulse transducer 1 cooperative with a wheel or a transmission of a taxi for developing pulses at a rate determined by the speed of the vehicle. Such transducers are known and the one illustrated in FIG. 2 of U.S. Pat. No. 3,512,706 issued May 19, 1970 is satisfactory for use with the present invention, although other transducers are also satisfactory. The pulses developed by transducer 1 are applied to a pulse rate adjusting circuit 2. The pulse rate adjusting circuit may be set to lower the pulse repetition rate to render subsequent processing easier. A suitable circuit is illustrated in FIG. 2 of U.S. Pat. No. 3,867,617 issued Feb. 18, 1975. Output pulses at the adjusted pulse repetition rate are applied to the fare computing circuit 3. The structure of this circuit is also known and is illustrated in FIG. 4 of the aforementioned U.S. Pat. No. 3,867,617.

The fare computing circuit 3 is responsive to tariff control signals developed by the tariff selector circuit 5 and applied to the fare computing circuit 3 through the plurality of circuit paths 4. The fare computing circuit 3 is responsive to the tariff control signals and develops a sequence of pulses at a repetition rate representative of an accrual rate at which the fare is accruing. The fare is computed according to the particular tariff represented by the applied tariff control signal and the pulses applied from the pulse rate adjusting circuit 2. The tariff selector circuit 5 is the subject of the co-pending application Ser. No. 474,212, filed May 29, 1974. Individual switches comprising switch set 6 are operable for controlling which tariff control signals are developed by the tariff selector circuit 5, thereby to set the tariff at which the fare is computed.

The sequence of pulses developed by the fare computing circuit 3 are applied to the fare rate control circuit 7. This circuit develops an output pulse sequence at the same rate as the applied pulses, when they exceed a certain predetermined pulse repetition rate, and develops output pulses at the predetermined pulse rate when the applied pulses from the fare computing circuit 3 are less than the predetermined pulse rate. The predetermined pulse repetition rate corresponds to a fare charged at an hourly rate, and the fare rate circuit 7 develops output pulses representative of a fare computed at an hourly rate, below a certain vehicle speed corresponding to the predetermined pulse rate. Thus, the fare is charged on an hourly basis below a predetermined vehicle speed, and is charged on the basis of the distance travelled in accordance with a selected tariff when the vehicle speed is above the predetermined speed.

The circuitry described thus far is generally powered by the output of the voltage regulator 8. However, if a supply of stable voltage is available in the vehicle, then the voltage regulator 8 may be dispensed with. A suitable commercially available regulator is the Fairchild $\mu$A 723 regulator circuit.

The sequence of pulses developed by the fare rate circuit 7 is applied through conductive path 9 to counting means 10. The counting means 10 is comprised of a plurality of counter circuits 11–15 connected in series to continually count the sequence of pulses developed by the fare rate circuit for developing a cumulative pulse count continually representative of an accrued fare represented by a number of the pulses developed by the fare rate circuit 7. The outputs of respective ones of the counter circuits 11–15 are each applied to a corresponding one of the decoder circuits 21–25. The individual decoder circuits 21–25 jointly comprise decoding means 20 for continually decoding the cumulative pulse count developed by the counting means 10 and for applying the decoded pulse count to fare display means 30. The fare display means 30 is jointly comprised of a plurality of display elements 31–35 which are each driven by a respective one of the decoder circuits 21–25.

The counter circuits, decoder circuits, and display elements are shown connected by broad arrows. These arrows represent a plurality of signal paths, the number of which depend upon the particular circuits used. For example, the counter circuits 11–15 may each preferably be a decade counter so that four signal paths will be required between each of the counter circuits and the corresponding decoder circuits. In this case, the decoder circuits are BCD-to-seven segment decoders having outputs for driving seven segment display elements as illustrated in the drawing. Alternatively, display elements having thirteen dots arranged in a matrix could be used and a correspondingly greater number of signal paths would be required between each decoder circuit and its corresponding display element. The choice of display elements and counter circuits will determine the decoder circuit required, and equivalent display configurations other than that illustrated are within the scope of this invention.

Each of the decoder circuits 21–25 includes means for enabling the same, and each is connected to receive an enabling signal through the circuit path 41. The enabling signal is a voltage developed by the regulator 8 for powering the tariff selector circuit 5 and the decoder circuits are inoperative unless they receive the enabling signal. Each of the counter circuits 11–15 include means for resetting the same and have a reset signal input connected to receive a reset signal developed by the inverter circuit 42. The inverter circuit 42 constitutes reset signal generating means and is connected between the circuit path 41 and the reset signal inputs of the counters 11–15. When no enabling signal is applied through the circuit path 41 the inverter 42 will develop an output reset signal which is continually applied to the counter circuits 11–15 to continually maintain them cleared. Consequently, pulses applied from the fare rate circuit 7 will not be counted by the counting means 10 and no cumulative pulse count will accumulate, in the absence of an enabling signal applied through circuit path 41.

The remote slave indicator illustrated in the drawing includes structure corresponding to the structure of the fare display previously described, and the corresponding structure is identified by corresponding reference numerals. Thus, the remote slave indicator includes second counting means 10' comprised of a plurality of counter circuits 11'–15'. Second decoding means 20' is comprised of a plurality of decoder circuits 21'–25' and is connected to decode the count developed by the second counting means 10', and to drive a second fare display means 30' which is jointly comprised of individual display elements 31'–35'. The enabling signal applied to the decoding means 20 is applied through circuit path 41' to the second decoding means 20'. Similarly, the sequence of pulses applied through the circuit paths 9 to the counting means 10 is also applied through the circuit path 9' to the second counting means 10'. Finally, the reset signal developed by inverter 42 and applied to the first counting means 10 is also applied through the circuit path 43 to the second counting means 10'.

Because of the structural correspondence between the two displays and because the remote slave display receives the same enabling signal, input pulse sequence and reset signal as the master display, the operation of the fare display means 30' in the remote slave display is controlled and coincides in operation with that of the master display.

The following illustrative description of the operation of the disclosed electronic taximeter depends in part upon the structure of the fare computing circuit 3, tariff selector circuit 5, and fare rate circuit 7. The described operation corresponds to the operation of the devices disclosed in the aforementioned patents. However, it should be understood that the detailed mode of operation is not critical to the present invention. Different sequences of operating modes, including different possible tariffs are possible so that the following description should not in any way limit the scope of the claimed invention to structure having a mode of operation corresponding to the following description.

The illustrated structure is operable in different modes including a "for hire" mode, an initial portion of a trip mode or "initial" mode, three different "tariff" modes dependent upon any one of three different selectable tariffs, and a "charge" mode. Each of these modes are selectable by operating a corresponding one of the switches comprising switch set 6. In the "for hire" mode no enabling signal is applied to the circuit path 41 so that the decoding means 20 and the second decoding means 20' are inoperative and the respective fare display means 30, 30' are not illuminated and display no fare. The tariff indicating lamp 56 is illuminated to indicate the "for hire" mode.

By actuating another of the switches of the switch set 6 the circuit is changed to the "initial" mode. At this instant no pulses are applied from the fare rate circuit 7 through the circuit paths 9, 9' to the respective counting means 10, 10'. No enabling signal is initially generated, however, voltage is supplied to the tariff indicator lamp 55 to indicate the "initial" mode, and the indicator lamp 56 is extinguished. Then, an initial fare charge is registered by a certain predetermined number of pulses automatically generated and transferred through the circuit paths 9 and 9' to the respective counting means 10 and 10'. The number of pulses generated is preset and the pulses are automatically generated, and at the same time an enabling signal is applied through circuit paths 41, 41' in order to enable the respective decoding means 20 and 20' and to terminate the reset signal developed by the inverter 42. The preset number of pulses representative of an initial fare charge are counted and the respective cumulative counts in the counting means 10 and 10' are decoded and the initial fare is displayed on the respective fare display means 30 and 30'.

After the initial fare has been charged an appropriate tariff is selected by actuating a corresponding one of the switches of switch set 6. This causes the tariff selector circuit 5 to develop an appropriate tariff control signal which is applied through the circuit path 4 to the fare computing circuit 3 to control the rate at which pulses are applied to the fare rate circuit 7. As the trip progresses pulses are generated and accumulate in dependence upon the distance travelled and/or the duration of the trip, under control of the fare rate circuit 7. This is the "tariff" mode of operation. The tariff selected is indicated by which of the indicating lamps 52–54 is illuminated.

At the end of the trip the electronic taximeter is switched to a "charge" mode in which the total fare or charge for the trip remains displayed on the respective fare display means 30, 30'. In this mode no pulses are applied to the circuit paths 9 and 9', however, the enabling signal remains applied to the respective decoding means 20 and 20' so that the counting means 10 and 10' are not cleared and retain the cumulative pulse counts representative of the total fare. This mode is indicated by the illumination of indicating lamp 51. After the fare has been paid the appropriate switch set 6 is set to change the mode back to the "for hire" mode which terminates the enabling signal thereby extinguishing the display means 30 and 30', and thereby developing a reset signal to clear the counting means 10 and 10'. The indicating lamp 51 is extinguished and lamp 56 is again illuminated to indicate the "for hire" mode.

The indicating lamps 51–56 jointly comprise tariff display means 50 for displaying the tariff at which the fare is computed. The remote slave indicator includes second tariff display means 50' comprised of corresponding indicating lamps 51'–56'. The tariff control signals applied to the tariff display means 50 are also applied to a multiplexing circuit 60 for transmission through three wires 62 to the remote slave indicator. The multiplexed tariff control signals are received by a demultiplexing circuit 61 of the remote slave indicator and are applied to corresponding ones of the indicating lamps 51'–56'. Tariff control signals applied to the fare computing circuit energize respective indicating lamps of the tariff display means 50 and are also transmitted to energize corresponding indicating lamps of the second tariff display means 50'. The second tariff display means 50' in the remote slave indicator is controlled by the tariff control signals developed by the tariff selector circuit 5 and therefore indicates the tariff at which the fare is being computed.

The transmission of the tariff control signals to the remote slave indicator requires only a three-wire conductive path 62 so that the number of connecting circuits between the remote slave indicator and the rest of the electronic taximeter is minimized. However, it is also possible to replace the multiplexing circuit 60 and demultiplexing circuit 61 with a plurality of circuit paths, each corresponding to a different pair of lamps respectively in the tariff display means 50 and second tariff display means 50', for connecting the respective pairs of lamps in parallel. In the embodiment of the invention illustrated in the drawing, six pairs of conductive circuit paths would be required. Although this is more than the minimum number of required circuit paths it allows for the elimination of the multiplexing and demultiplexing circuits. However, it is generally preferred to minimize the number of circuit paths by including the multiplexing circuitry. The multiplexing and demultiplexing circuits are commercially available and the Texas Instruments types SN 74148 and SN 74159, respectively, are suitable for use in the present invention.

If the second fare display means 30' were directly connected in parallel with the fare display means 30, at least seven signal paths would be required between each of the individual display elements of the respective displays so that at least thirty five separate individual signal paths would be required to connect both of the display means. Moreover, if the multiplexing circuitry is eliminated, at least an additional six circuit lines are required so that a total in excess of forty individual circuit paths would be required, exclusive of any power and control signal circuit paths. The present invention results in structure requiring only five circuit paths between the remote slave indicator and the rest of the electronic taximeter. Moreover, the capacity of the fare display means can be increased by adding additional counting circuits, decoder circuits and fare display elements without increasing the number of circuit paths required to connect the remote slave display to the rest of the electronic taximeter circuit. The resulting structure is therefore highly immune from intermittent or faulty operation caused by failure of the inter-connecting circuit paths between the remote slave display and the rest of the circuit.

What I claim is:

1. In an electronic taximeter of the type including fare computing means responsive to tariff control signals for developing a sequence of pulses at a repetition rate representative of an accrual rate at which the fare computed according to the particular tariff represented by said tariff control signals accrues, and tariff selecting means operable for selecting the tariff control signals representing the tariff at which the fare is being computed thereby to change the pulse repetition rate of said sequence of pulses; the improvement which comprises: a master-remote slave display pair for displaying the tariff at which the fare is being computed and for displaying the accrued fare as it continually accrues, the master display comprising counting means operable to continually count said sequence of pulses for developing a cumulative pulse count continually representative of an accrued fare represented by a number of said pulses developed, said counting means including resetting means responsive to a reset signal for resetting said counting means to clear the cumulative pulse count stored therein; fare display means for displaying an accrued fare represented by the cumulative pulse count stored in said counting means; decoding means connected to receive the cumulative pulse count stored in said counting means for continually decoding the cumulative pulse count and connected to said display means to apply the decoded pulse count to said fare display means for driving the same to display the accrued fare represented by the cumulative pulse count, said decoding means being normally inoperative and including enabling means responsive to an enabling signal for rendering said decoding means operative; reset signal generating means normally developing a reset signal and applying the same to said resetting means for resetting said counting means and being rendered inoperative by and connected to receive said enabling signal for terminating the reset signal thereby to render said counting means operative to count said sequence of pulses upon the occurence of said enabling signal; and tariff display means receptive of said tariff control signals for displaying the tariff at which the fare is computed; the remote slave display being located remote from said master display and comprising second counting means operable to continually count said sequence of pulses for developing a cumulative pulse count continually representative of the accrued fare represented by the number of pulses developed, said second counting means including second resetting means responsive to said reset signal for resetting said second counting means; second fare display means for displaying the accrued fare represented by the cumulative pulse count stored in said second counting means; second decoding means connected to receive the cumulative pulse count stored in said second counting means for continually decoding this cumulative pulse count and connected to said second display means to apply the decoded pulse count to said second display means for driving the same to display the accrued fare represented by the cumulative pulse count stored in said second counting means, said second decoding means being normally inoperative and including enabling means responsive to said enabling signal for rendering said second decoding means operative; and second tariff display means responsive to said tariff control signals for displaying the tariff at which the fare is computed; means for applying said sequence of pulses to said second counting means; means for applying said enabling signal to said second decoding means; means for applying said reset signal to said second reset means; and means for applying said tariff control signals to said second tariff display means.

2. In an electronic taximeter according to claim 1, wherein: said counting means and said second counting means each comprise a plurality of counter circuits connected in series; said fare display means and said second fare display means each comprise a plurality of visual display elements for displaying numerals; and said decoding means and said second decoding means each comprise a plurality of decoder circuits each connected between a respective counter circuit and a respective display element whereby each of the display elements displays numerals representative of a count stored in the respective counter circuit.

3. In an electronic taximeter according to claim 2, wherein: each of said counters comprise a binary counter, whereby the cumulative pulse count stored in each of the series combinations of counter circuits is a binary coded decimal representation of the cumulative total of counted pulses; each of said display elements is operable for displaying a decimal character; and said decoder circuits are decoders for decoding the binary counts stored in the respective counter circuits and developing signals to drive the respective display elements to display decimal characters representative of the respective binary counts stored in the respective counters thereby to jointly display the fare represented by the cumulative pulse count in a decimal format.

4. In an electronic taximeter according to claim 1, wherein: said enabling signal comprises a voltage applied to said decoding means for enabling the same; and said reset signal generating means comprises an inverter connected to receive and invert said enabling signal and to apply the inverted enabling signal to said resetting means, said inverter normally developing a reset signal in the absence of an enabling signal to continually clear said counting means and said inverter developing no reset signal in the presence of said enabling signal for enabling said counting means to count said sequence of pulses to develop the cumulative pulse count representative of accrued fare and to prevent resetting of said counting means as long as said display means is enabled thereby to continually display the accrued fare even after the fare has stopped accruing.

5. In an electronic taximeter according to claim 1, wherein: said tariff display means comprises a plurality of visual indicating elements each connected to receive and be enabled by a respective tariff control signal for visually indicating the tariff corresponding to the respective tariff control signal; said second tariff display means comprises a second plurality of visual indicating elements each corresponding to a respective one of said visual indicating elements comprising said tariff display means; and said means for applying said tariff control signals comprises a multiplexer connected to receive the respective tariff control signals for transmitting the same over a single channel, a demultiplexer within said remote slave display for receiving multiplexed tariff control signals to demultiplex the same and apply the respective tariff control signal to corresponding ones of the visual indicating elements comprising said second tariff display means for visually indicating the tariff corresponding to the respective tariff control signal, and three wires connected between said multiplexer and said demultiplexer for defining a channel therebetween for the transmission of multiplexed tariff control signals from said multiplexer to said demultiplexer.

6. In an electronic taximeter according to claim 1, wherein: said means for applying said sequence of pulses to said second counting means comprises a single conductive circuit path.

7. An electronic taximeter comprising: an adjusting and computing circuit responsive to tariff control signals for receiving pulses developed at a rate proportional to distance travelled and for developing in response thereto a sequence of pulses at a repetition rate representative of an accrual rate at which the fare computed according to the particular tariff represented by said tariff control signal accrues; a tariff selector circuit operable for selecting the tariff control signals representing the tariff at which the fare is being computed thereby to change the pulse repetition rate of said sequence of pulses; a master remote slave display pair for displaying the tariff at which the fare is being computed and for displaying the accrued fare as it continually accrues, the master display comprising counting means operable to continually count said sequence of pulses for developing a cumulative pulse count continually representative of an accrued fare represented by a number of said pulses developed, said counting means including resetting means responsive to a reset signal for resetting said counting means to clear the cumulative pulse count stored therein; fare display means for displaying an accrued fare represented by the cumulative pulse count stored in said counting means; decoding means connected to receive the cumulative pulse count stored in said counting means for continually decoding the cumulative pulse count and connected to said display means to apply the decoded pulse count to said fare display means for driving the same to display the accrued fare represented by the cumulative pulse count, said decoding means being normally inoperative and including enabling means responsive to an enabling signal for rendering said decoding means operative; reset signal generating means normally developing a reset signal and applying the same to said resetting means for resetting said counting means and being rendered inoperative by and connected to receive said enabling signal for terminating the reset signal thereby to render said counting means operative to count said sequence of pulses upon the occurrence of said enabling signal; and tariff display means receptive of said tariff control signals for displaying the tariff at which the fare is computed; the remote slave display being located remote from said master display and comprising second counting means operable to continually count said sequence of pulses for developing a cumulative pulse count continually representative of the accrued fare represented by the number of pulses developed, said second counting means including second resetting means responsive to said reset signal for resetting said second counting means; second fare display means for displaying the accrued fare represented by the cumulative pulse count stored in said second counting means; second decoding means connected to receive the cumulative pulse count stored in said second counting means for continually decoding this cumulative pulse count and connected to said second display means to apply the decoded pulse count to said second display means for driving the same to display the accrued fare represented by the cumulative pulse count stored in said second counting means, said second decoding means being normally inoperative and including enabling means responsive to said enabling signal for rendering said second decoding means operative; and second tariff display means responsive to said tariff control signals for displaying the tariff at which the fare is computed; means for applying said sequence of pulses to said second counting means; means for applying said enabling signal to said second decoding means; means for applying said reset signal to said second reset means; and means for applying said tariff control signals to said second tariff display means.

8. An electronic taximeter according to claim 7, wherein: said counting means and said second counting means each comprise a plurality of counter circuits connected in series; said fare display means and said second fare display means each comprise a plurality of visual display elements for displaying numerals; and said decoding means and said second decoding means each comprise a plurality of decoder circuits each connected between a respective counter circuit and a respective display element whereby each of the display elements displays numerals representative of a count stored in the respective counter circuit.

9. An electronic taximeter according to claim 8, wherein: each of said counters comprise a binary decade counter, whereby the cumulative pulse count stored in each of the series combinations of counter circuits is a binary coded decimal representation of the cumulative total of counted pulses; each of said display elements is operable for displaying a decimal characters; and said decoder circuits are BCD-to-seven segments decoders for decoding the binary counts stored in the respective counter circuits and developing signals to drive the respective display elements to display decimal characters representative of the respective binary counts stored in the respective counters thereby to jointly display the fare represented by the cumulative pulse count in a decimal format.

10. An electronic taximeter according to claim 7, wherein: said enabling signal comprises a voltage applied to said decoding means for enabling the same; and said reset signal generating means comprises an inverter connected to receive and invert said enabling signal and to apply the inverted enabling signal to said resetting means, said inverter normally developing a reset signal in the absence of an enabling signal to continually clear said counting means and said inverter developing no reset signal in the presence of said enabling signal for enabling said counting means to count said sequence of pulses to develop the cumulative pulse count representative of accrued fare and to prevent resetting of said counting means as long as said display means is enabled thereby to continually display the accrued fare even after the fare has stopped accruing.

11. An electronic taximeter according to claim 7, wherein: said tariff display means comprises a plurality of visual indicating elements each connected to receive and be enabled by a respective tariff control signal for visually indicating the tariff corresponding to the respective tariff control signal; said second tariff display means comprises a second plurality of visual indicating elements each corresponding to a respective one of said visual indicating elements comprising said tariff display means; and said means for applying said tariff control signals comprises a multiplexer connected to receive the respective tariff control signals for transmitting the same over a single channel, a demultiplexer within said remote slave display for receiving multiplexed tariff control signals to demultiplex the same and apply the respective tariff control signals to corresponding ones of the visual indicating elements comprising the second tariff display means for visually indicating the tariff corresponding to the respective tariff control signal, and three wires connected between said multiplexer and said demultiplexer for defining a channel therebetween for the transmission of multiplexed tariff control signals from said multiplexer to said demultiplexer.

12. An electronic taximeter according to claim 7, wherein: said means for applying said sequence of pulses to said second counting means comprises a single conductive circuit path.

* * * * *